(12) United States Patent
Voytenko et al.

(10) Patent No.: US 11,153,392 B2
(45) Date of Patent: Oct. 19, 2021

(54) METHODS AND APPARATUS FOR SESSION BUILDING FROM PING-LEVEL DATA

(71) Applicant: The Nielsen Company (US), LLC, New York, NY (US)

(72) Inventors: Denis Voytenko, Oldsmar, FL (US); Rachel Worth Olson, Elk Grove Village, IL (US); Elisabeth Weber, Arlington, VA (US); Richard Peters, Paw Paw, IL (US); Paul Chimenti, Tampa, FL (US); David J. Kurzynski, South Elgin, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 16/702,321

(22) Filed: Dec. 3, 2019

(65) Prior Publication Data
US 2021/0168214 A1 Jun. 3, 2021

(51) Int. Cl.
*H04L 12/26* (2006.01)
*H04L 29/08* (2006.01)

(52) U.S. Cl.
CPC ........... *H04L 67/147* (2013.01); *H04L 43/10* (2013.01); *H04L 67/141* (2013.01); *H04L 67/143* (2013.01)

(58) Field of Classification Search
None
See application file for complete search history.

(56) References Cited

U.S. PATENT DOCUMENTS

| | | | |
|---|---|---|---|
| 6,133,912 A | 10/2000 | Montero | |
| 7,386,672 B2 | 6/2008 | Casazza | |
| 8,539,021 B2 | 9/2013 | Montero | |
| 8,863,166 B2 | 10/2014 | Harsh et al. | |
| 9,098,511 B1 | 8/2015 | Lawry et al. | |
| 9,369,762 B2 | 6/2016 | Falcon | |
| 9,578,451 B2 | 2/2017 | Park et al. | |
| 9,760,902 B2 | 9/2017 | Van de Sompel et al. | |
| 10,133,809 B1 | 11/2018 | Lawry et al. | |
| 10,511,873 B1 | 12/2019 | Voytenko et al. | |

(Continued)

OTHER PUBLICATIONS

International Searching Authority, "International Search Report and Written Opinion," issued in connection with International Patent Application No. PCT/US2020/062083, dated Mar. 19, 2021, 9 pages.

*Primary Examiner* — Joshua Joo
(74) *Attorney, Agent, or Firm* — Hanley, Flight & Zimmerman, LLC

(57) ABSTRACT

Methods, apparatus, systems and articles of manufacture to build viewing sessions from ping-level data are disclosed herein. An example apparatus includes a threshold calculator to determine a threshold based on reference sessions represented in panel data obtained from panel meters. The example apparatus also includes a session partitioner to determine if a first ping from a device corresponds to a start ping of the session and a second ping from the device corresponds to an end ping of the session based on (i) the threshold, (ii) first payload data from the first ping, and (iii) second payload data from the second ping. The example apparatus includes the session partitioner to also determine a duration of the session based on a difference between a first time associated with the first ping and a second time associated with the second ping.

20 Claims, 9 Drawing Sheets

(56) References Cited

U.S. PATENT DOCUMENTS

| | | |
|---|---|---|
| 2005/0188318 A1* | 8/2005 | Tamir .................... G06F 16/951 |
| | | 715/744 |
| 2010/0088373 A1 | 4/2010 | Pinkham |
| 2011/0041062 A1 | 2/2011 | Singer et al. |
| 2013/0198125 A1 | 8/2013 | Oliver et al. |
| 2013/0262184 A1 | 10/2013 | Jain et al. |
| 2014/0201799 A1 | 7/2014 | Smith |
| 2014/0358676 A1 | 12/2014 | Srivastava et al. |
| 2016/0379234 A1 | 12/2016 | Shah et al. |
| 2017/0064393 A1* | 3/2017 | Carlson .............. H04N 21/4532 |
| 2017/0070304 A1 | 3/2017 | Jakkula et al. |
| 2017/0293933 A1 | 10/2017 | Edwards et al. |
| 2018/0084313 A1* | 3/2018 | Splaine ............... H04N 21/2405 |
| 2018/0376184 A1 | 12/2018 | Sheppard et al. |
| 2019/0034942 A1 | 1/2019 | Guo et al. |
| 2019/0122237 A1 | 4/2019 | Splaine et al. |
| 2020/0013089 A1* | 1/2020 | Narayan ................. G06F 16/27 |
| 2020/0136889 A1* | 4/2020 | Chen ....................... H04L 41/14 |

\* cited by examiner

METHODS AND APPARATUS FOR SESSION BUILDING FROM PING-LEVEL DATA

FIELD OF THE DISCLOSURE

This disclosure relates generally to audience measurement, and, more particularly, to methods and apparatus for session building from ping-level data.

BACKGROUND

Audience viewership data is collected and used by audience measurement entities (Ames) to determine exposure statistics (e.g., viewership statistics) for different media. Some viewership data may be collected through the use of pings from user devices. For example, these pings may be transmitted by the user devices to an AMEN via one or more networks. Information from the ping is processed by the AME to determine useful media exposure data and associated statistics.

BRIEF DESCRIPTION OF THE DRAWINGS

The figures are not to scale. In general, the same reference numbers will be used throughout the drawing(s) and accompanying written description to refer to the same or like parts.

Figure 1:
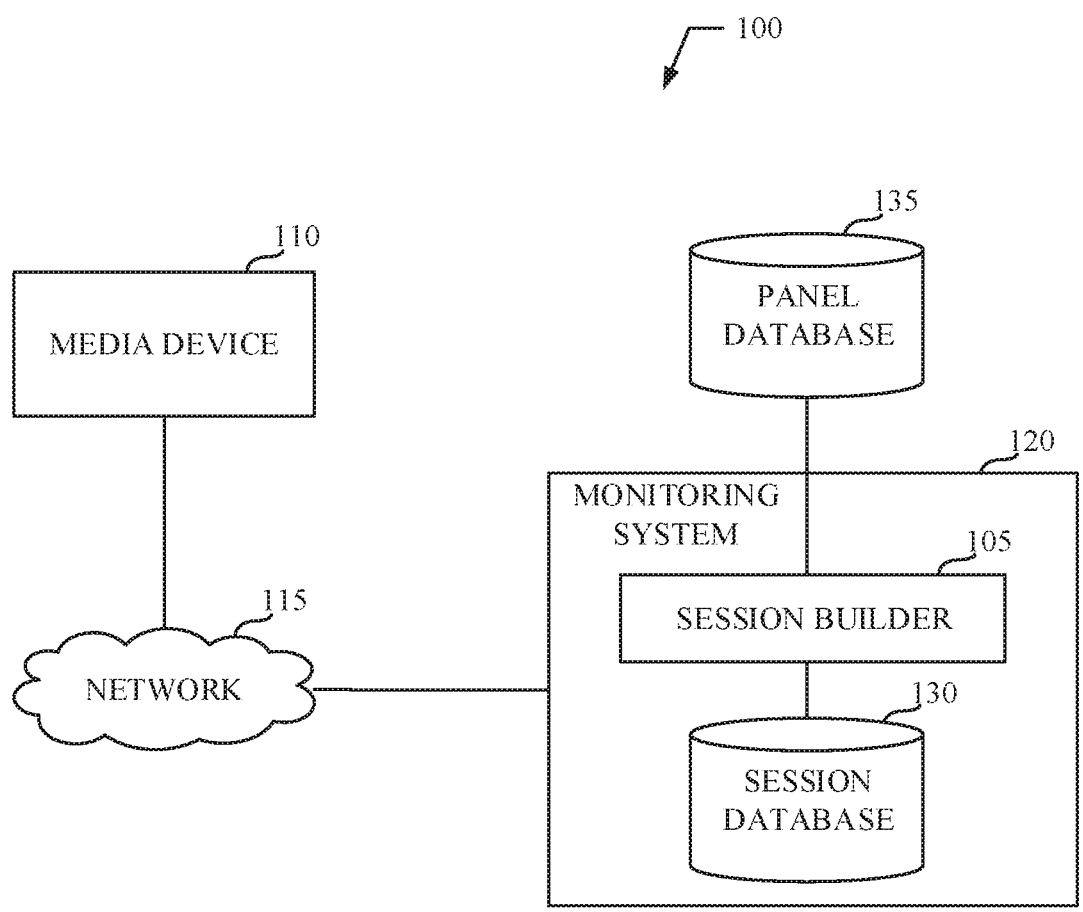
FIG. 1 illustrates an example environment in which an example session builder builds sessions from ping-level data in accordance with teachings disclosed herein.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Audience viewership data may be acquired through the use of event-level data, such as ping-level data. In some examples, audience measurement based on viewership patterns relies on having access to the start times, end times and durations of media viewing sessions or, more generally, media exposure sessions. However, some media clients do not report such session-level data and, instead, report ping-level data. Ping-level data indicates when events occur in the viewing session and may include media identification information (e.g., program name, episode name, genre, application, etc.) in the ping payload data. For example, the pings may be triggered by events such as expiration of a heartbeat interval (e.g., a 5 minute heartbeat interval), when content changes, when advertisements are presented, etc.

In examples disclosed herein, a session is defined to be a period of continuous exposure to (e.g., viewership of) (e.g., partitioned on the same program, episode, genre, application) media on the same device during which one of more characteristics of the media are unchanged. As such, a session has a defined start and end time. In some examples, the media characteristic(s) defining a session include one or more of a program identifier, an episode identifier, a genre identifier, and application identifier, etc. In examples disclosed herein, a set of ping-level data from a user device is used to build exposure (e.g., viewing) sessions, generally referred to as sessions, that represent the user's media exposure (e.g., viewership) during the time period the pings in the ping-level data were acquired. Examples disclosed herein transform the ping-level data to session-level data identifying the start time, end time and duration of the sessions. In examples disclosed herein, respective sessions are built by determining corresponding session durations from the ping-level data as described in further detail below. For convenience, examples disclosed herein are described from the perspective of building viewing sessions, but such examples also apply to building any other type of media exposure sessions (e.g., corresponding to exposure to media other than visual media, such as audio media, tactile media, etc.).

In some examples, viewing sessions are built from the collected ping-level data based on a threshold defining an upper limit on the duration of a viewing session. For example, the ping-level data may be transformed to session-level data to define a viewing session according to whether the time difference between two reported pings is greater than or equal to the threshold value. If a subsequent ping is received within a time frame that is less than the threshold value, the subsequent ping may be included into the session with the prior ping (e.g., if the media characteristic(s) used to partition the sessions has remained unchanged between the prior ping and the subsequent ping). However, if the subsequent ping is received within a time frame that is greater than or equal to the threshold value, the subsequent ping is determined to be the start of a new session. In some examples, this threshold value can be defined based on input configuration data (e.g., entered by an operator) or empirically determined from previously determined viewing session duration data. In some examples, the viewing duration for a given viewing session is calculated as the difference between the start time associated with the first ping of the session and the end time determined from the last ping of the session, as described above.

Thus, in some examples, the viewing session durations are determined based on the time between two consecutive pings. However, this does not account for possible changes in the media identification information of the ping-level data, such as a change in a program name or episode name. This can be problematic in examples where the timing between two consecutive pings is less than the threshold, but the program was changed between these two pings. If just the time difference between the pings is considered when building sessions, these two pings might be classified as belonging to the same viewing session since the threshold was not met to signify a change in viewing session. However, the change in program would correspond to the start of a new viewing session.

To address such technical problems, examples disclosed herein determine viewing session durations by both comparing the time durations between pings to a threshold and detecting changes in the payload data included in the pings. In some examples, multiple session building procedures are operated in parallel such that different session building procedures perform session partitioning based on different information included in the payload data of each ping (e.g., program names vs. genre identifiers) to enable multiple partitioning schemes to be evaluated. The multiple session building procedures may operate on pipelines running in parallel in order to determine different possible durations for the same viewing session. After the set of session building procedures is completed for the different partitioning schemes, the viewing sessions determined by the different partitioning schemes are compared to determine which of the partitioning schemes built viewing sessions from the ping-level data that most align with the panel data. In some examples, for each partitioning scheme, the viewing sessions are compared to a demographics model generated from the panel data. In some such examples, one of the partitioning schemes is chosen to represent the viewing sessions for the set of ping data based on criteria when compared to the demographic model from the panel data.

Examples disclosed herein provide technical solutions to the technical problems described above by capturing changes in the content of the ping-level data when determining viewing sessions. Examples disclosed herein also allow for a more flexible approach to determining viewing sessions by testing different partitioning schemes on the ping-level data. This approach enables generation of viewing sessions from a particular set of ping data that satisfy one or more criteria (e.g., a change in the genre content, a change in the program name, a change in the episode name, etc.).

FIG. 1 illustrates an example environment 100 in which an example session builder 105 build sessions from captured ping-level data in accordance with teachings of this disclosure. The example environment 100 of FIG. 1 includes an example media device 110, an example network 115, an example monitoring system 120, and an example panel database 135. The example monitoring system 120 includes the example session builder 105 and an example session database 130.

In the illustrated example of FIG. 1, the media device 110 is used to access and view different media. The example media device 110 also sends ping data to the network 115 to log viewing information associated with the access and/or presentation of the media by the media device 110. The example media device 110 can be implemented with any device or combinations of devices that are able to connect to media such as, for example, a smart television (TV), a personal computer, a smartphone, a tablet device, a set-top box (STB), a game console, a digital video recorder (DVR), an Apple TV, a Roku device, YouTube TV, an Amazon fire device, etc., or any combination thereof.

The example network 115 of the illustrated example of FIG. 1 provides communication between the user device 110 and the monitoring system 120. The example network 115 is implemented as a public network such as, for example, the Internet. However, any other type of networks (e.g., wired/cabled, wireless, mobile cellular, etc.) which may be public or private, and any combination thereof may additionally and/or alternatively be used.

The monitoring system 120 of the illustrated example of FIG. 1 receives ping data, also referred to as pings, from the media device 110 via the network 115. The monitoring system 120 captures the payload data included in the ping data for use in the building of viewing sessions. The payload of a ping received by the monitoring system 120 includes information on the time the ping was transmitted by and/or received from the media device 110, what device the ping was received from, the media content that was viewed on the media device 110 at the time the ping was transmitted (e.g., genre, program name, episode name, etc.), etc. The session builder 105 extracts the time information from the payload data of the ping data as well as the media content information from the payload data of the ping data to build the viewing sessions.

Figure 2:
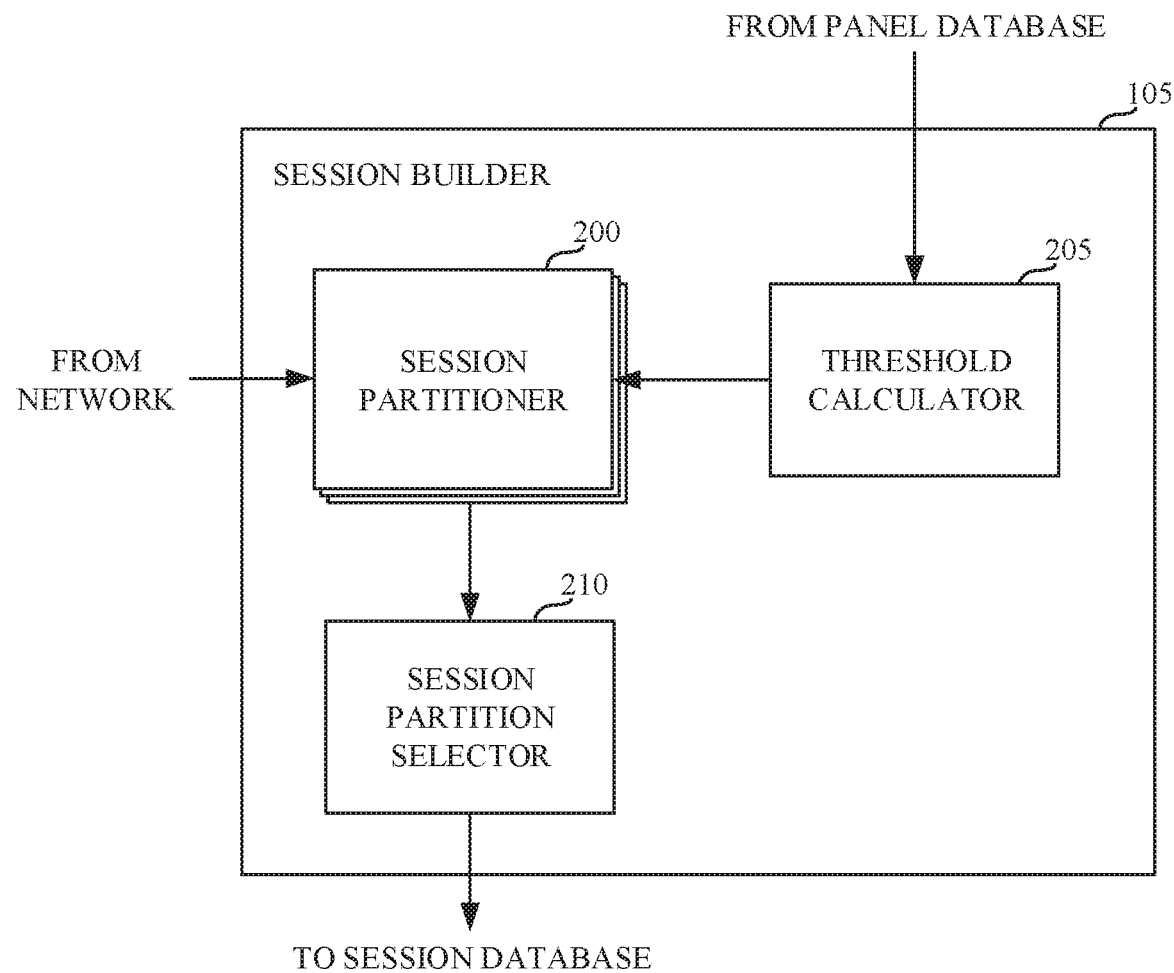
FIG. 2 is block diagram representative of the example session builder of FIG. 1.

The session builder 105 of the illustrated example of FIG. 1 determines viewing sessions from the ping data received by the monitoring system 120. For example, the session builder 105 determines viewing session durations from the ping data reported by the mobile device 110 by determining the respective start and end pings for each viewing session. The session builder 105 uses the payload data within the reported ping data to determine whether the received ping is a start ping for a new viewing session, an end ping for a current viewing session, or a ping associated with the current viewing session (e.g., is neither a start ping nor an end ping). The session builder 105 of the illustrated example generates viewing sessions from the ping data by determining durations for each of the viewing sessions using the ping data and corresponding payload data. An example implementation of the session builder 105 is illustrated in FIG. 2, which is described in further detail below.

The session database 130 of the illustrated example of FIG. 1 stores information describing the viewing sessions determined by the session builder 105. However, other data may additionally and/or alternatively be stored by the session database 130. The session database 130 of the illustrated example of FIG. 1 is implemented by any memory, storage device, and/or storage disc for storing data such as, for example, flash memory, magnetic media, optical media, solid state memory, hard drive(s), thumb drive(s), etc. Furthermore, the data stored in the example session database 130 may be in any data format such as, for example, binary data, comma delimited data, tab delimitated data, structured query language (SQL) structures, etc. While the session database 130 is illustrated as a single device in the illustrated example of FIG. 1, the session database 130 and/or any other data storage devices described herein may be implemented by any number and/or type(s) or memories.

The example panel database 135 of the illustrated example of FIG. 1 stores that panel data collected by meters and/or meter applications associated with and/or executed by media devices of panelists. In examples disclosed herein, the panel data is collected from panelists to monitor the operation of the media devices and/or the media presented by the media devices. The panel data can include session level data characterizing the viewing sessions, as well as ping data reported by the panelists' media devices. The ping data can be compared with corresponding session level data for respective ones of the monitored media devices to determine relationships between ping data and sessions.

The example panel database 135 provides the panel data information to be used by the session builder 105. As described above, the panel data includes session level data and ping data from panelists' media devices, and this information can include, for example, viewing session data, panelists demographics information, etc. However, other data may additionally and/or alternatively be stored by the panel database 135. The example panel database 135 provides the session builder 105 with viewing session information that can be used as reference viewing sessions when determining viewing sessions from the ping-data received by the monitoring system 120. The panel database 135 of the illustrated example of FIG. 1 is implemented by any memory, storage device, and/or storage disc for storing data such as, for example, flash memory, magnetic media, optical media, solid state memory, hard drive(s), thumb drive(s), etc. Furthermore, the data stored in the example panel database 135 may be in any data format such as, for example, binary data, comma delimited data, tab delimitated data, structured query language (SQL) structures, etc. While, in the illustrated example of FIG. 1, the panel database 135 is illustrated as a single device, the panel database 135 and/or any other data storage devices described herein may be implemented by any number and/or type(s) or memories.

FIG. 2 is a block diagram illustrating an example implementation of the example session builder 105 of FIG. 1. The example session builder 105 of FIG. 2 includes an example session partitioner 200, an example threshold calculator 205, and an example session partition selector 210.

The example session partitioner 200 of the illustrated example of FIG. 2 receives the ping data from the network 115 of FIG. 1. In examples disclosed herein, the session partitioner 200 determines viewing sessions from ping-level data using different partitioning schemes. The different partitioning schemes may include partitioning based on genre, program name, episode name, etc. However, on any other content categories may additionally or alternatively used for partitioning. In the illustrated example of FIG. 2, three session partitioners 200 are shown. However, any number of session partitioners 200 may additionally or alternatively be used. For example, a session builder 105 depicted in FIG. 2 may contain, for example, five session partitioner 200 circuits. Utilizing additional session partitioners 200 enables additional partitioning schemes to be evaluated when determining viewing sessions. For example, having three session partitioners 200 allows for comparison of viewing sessions built according to three different partitioning schemes. In the illustrated example, the session partitioners 200 are operated in parallel to improve efficiency of building the viewing sessions.

The example threshold calculator 205 of the illustrated example of FIG. 2 receives the panel data from the panel database 135. The example threshold calculator 205 determines a threshold value based on the reference viewing sessions data stored in the panel data from the panel database 135. The threshold calculator 205 selects viewing session durations from the reference viewing sessions data based on a criterion. For example, the criterion may be the 10% longest viewing session durations stored in the panel database 135. However, other criterions may additionally or alternatively be used. The threshold calculator 205 averages the viewing session durations selected and sets the threshold value to the average found. The threshold value determined by the threshold calculator 205 is used by the session partitioner 200 to build the viewing sessions, which is discussed below in connection with FIG. 3.

The example session partition selector 210 of the illustrated example of FIG. 2 determines which of the viewing sessions built in the session partitioner 200 to select to represent the set of ping-level data received. In the examples disclosed herein, the viewing sessions from the different partitioning schemes implemented by the session partitioner(s) 200 are tested against a demographics model constructed from the panel data in the panel database 135 to determine which partitioning scheme aligns best with the expected viewing sessions from the demographics model. The performance of the viewing sessions compared to the demographics model is determined by a performance criterion. For example, the performance criterion may be a percentage of similarity between the viewing session from the session partitioner 200 and the viewing session from the demographics model. However, the other criteria may additionally or alternatively be used when determining the performance. The example session partition selector 210 stores the selected the viewing sessions in the session database 130.

Figure 3:
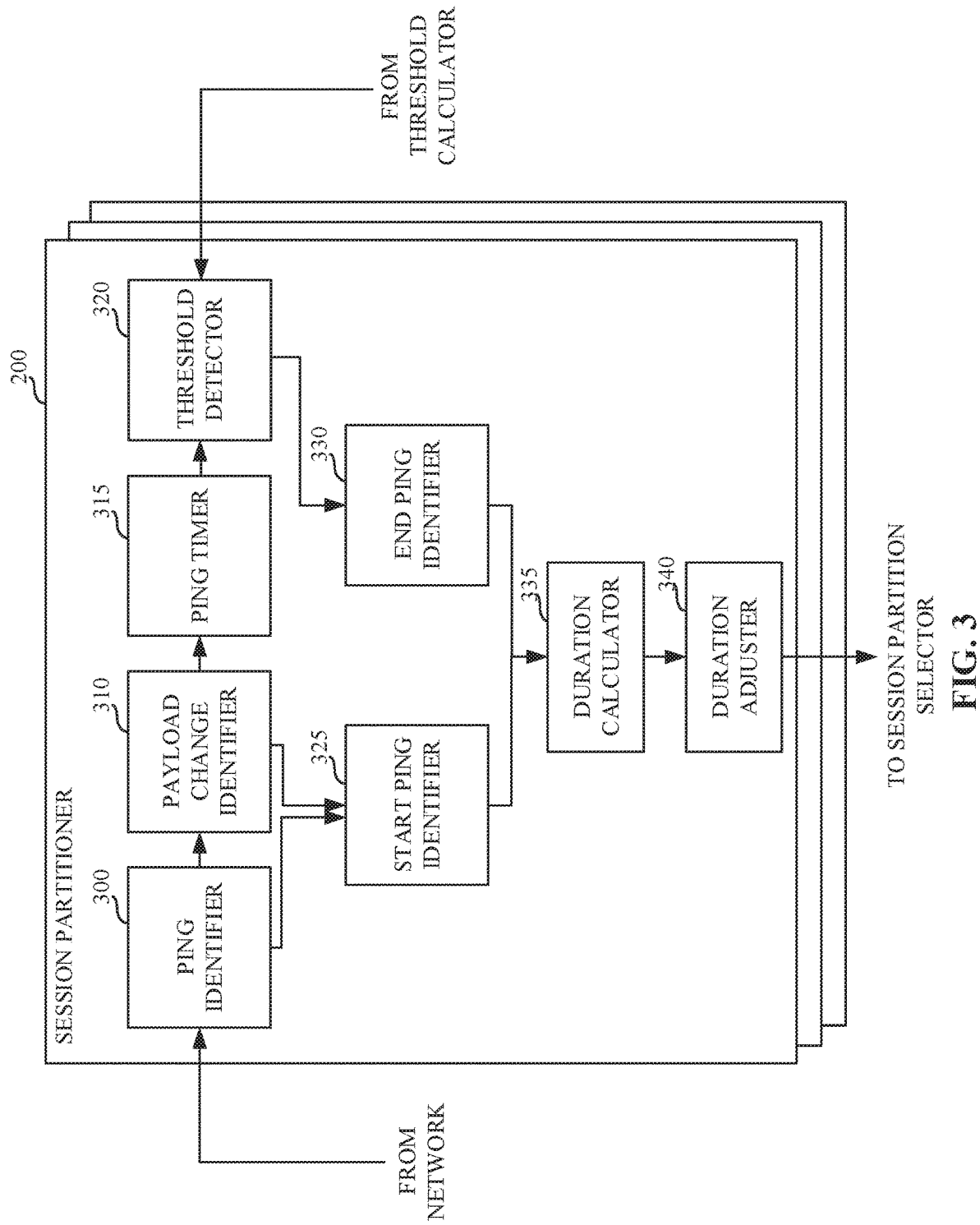
FIG. 3 is a block diagram representative of an example session partitioner included in the example session builder of FIG. 2.

FIG. 3 is a block diagram illustrating an example implementation of the session partitioner 200 of FIG. 2. The example session partitioner 200 of FIG. 3 includes an example ping identifier 305, an example payload change identifier 310, an example ping timer 315, an example threshold detector 320, an example start ping identifier 325, an example end ping identifier 330, an example duration calculator 335, and an example duration adjuster 340.

The example ping identifier 305 of the illustrated example of FIG. 3 receives a ping from the network 115 of FIG. 1. The example ping identifier 305 determines if the ping is the initial ping from a client/device. The example ping identifier 305 outputs the ping to the start ping identifier 325 if the ping identifier 305 determines that the ping is the first ping from the client/device. The example ping identifier outputs the ping data to the payload change identifier 310 if the ping identifier 305 determines that the ping is not the first ping from the client/device.

The example payload change identifier 310 of the illustrated example of FIG. 3 accesses the ping from the ping identifier 300 when the payload data of the ping indicates the ping is not a first ping from the device/client. The example payload change identifier 310 determines if the payload data from the ping indicates a change in content, such as a change in genre, program name, or episode name. However, other categories of content may additionally or alternatively be used. In examples disclosed herein, genre is defined to be a subcategory of media content (e.g., action, comedy, mystery, etc.), program name is defined to be a descriptor of the name of the media program such as, for example, a television program (e.g., Game of Thrones, Saturday Night Live, etc.), and episode name is defined to be a descriptor of the program name that indicated the name of the episode of the program (e.g., episode 1, 101, ep. 4, etc.). However, the genre, program name, and episode name are not limited to these examples, and other examples of the content categories may additionally or alternatively be used in determining a change in content. The example payload change identifier 310 determines if there is a change in the payload data depending on the partitioning scheme being used by the session partitioner 200. For example, if the session partitioner 200 is partitioning viewing sessions based on genre, then the payload change identifier 310 determines if there are changes in the genre content of the payload data from the received ping. For example, if the payload data indicates that the genre of the media changed from action to comedy, the example payload change identifier 310 would indicate that there was a change in the payload data. In examples disclosed herein, the payload change identifier 310 may use any combination of the partitioning criteria (e.g. genre, program name, episode name, etc.) when determining a change in content of the payload data. The example payload change identifier 310 outputs the ping to the start ping identifier 325 if the payload change identifier 310 determines that there is a change in the content of the payload data based on the partitioning scheme. The example payload change identifier 310 output the ping data to the ping timer 315 if the payload change identifier 310 determines there was no change in the content of the payload data based on the partitioning scheme.

The example ping timer 315 of the illustrated example of FIG. 3 accesses the ping from the payload change identifier 310 when the payload data of the ping indicates no change in the media characteristic(s) according to the partitioning scheme implemented by the payload change identifier 310. The example ping timer 315 is provided to determine the time difference between the current ping and the preceding ping. The example ping timer 315 calculates the amount of time between the current ping and the preceding ping using the ping data. In some examples, a ping includes one or more time stamps corresponding to a time or times at which the ping was transmitted by and/or received from the media device 110. In the illustrated example, the ping timer 315 determines the difference between the time stamp(s) of the current ping and the time stamp(s) of the preceding ping, and outputs the difference to the threshold detector 320.

The example threshold detector 320 of the illustrated example of FIG. 3 accesses the ping and the time difference between the ping and the preceding ping from the ping timer 315. The threshold detector 320 accesses a threshold value from the threshold calculator 205 of the example FIG. 2. The example threshold detector 320 determines whether the time difference between the accessed ping and the preceding ping satisfies the threshold value. For example, threshold detector 320 determines whether the time difference between the accessed ping and the preceding ping is greater than or equal to the threshold value. The example threshold detector 320 outputs the ping data to the start ping identifier 325 if the time difference determined by the ping timer 315 is greater than or equal to the threshold value from the threshold calculator 205. The example threshold detector 320 output the ping data to the end ping identifier 330 if the time difference determined by the ping timer 315 is less than the threshold value from the threshold calculator 205.

The example start ping identifier 325 of the illustrated example of FIG. 3 accesses the ping from the ping identifier 300, the payload change identifier 310, or the threshold detector 320 when the ping is indicated to be the start ping for a new viewing session. The example start ping identifier 325 labels the ping as a start ping for the new viewing session. This label may be a flag that is attached to the ping to signify the ping as a start ping for a viewing session. However, other labels may additionally or alternatively be used such as, for example, the addition of a special character to the ping data, highlighting the ping data, etc. The start ping identifier 325 outputs the ping data to the duration calculator 335 when a viewing session duration needs to be calculated. The viewing session duration is calculated once an end ping is found for the viewing session.

The example end ping identifier 330 of the illustrated example of FIG. 3 accesses the ping from the threshold detector 320 when the ping is indicated to not be the start ping for a new viewing session. The example end ping identifier 330 stores the accessed ping as a candidate end ping for the viewing session. If a next ping after the accessed ping is labeled a start ping for a new viewing session by the example start ping identifier 325, the example end ping identifier 330 labels the accessed ping as an end ping for the prior viewing session. The label may be a flag that is attached to the ping data to signify the ping as an end ping for a viewing session. However, other labels may additionally or alternatively be used such as, for example, the addition of a special character to the ping data, highlighting the ping data, etc. If the next ping after the accessed ping is not labeled a start ping for a new viewing session by the example start ping identifier 325, the example end ping identifier discards the stored candidate end ping and stores the next ping as a candidate end ping. The end ping identifier 330 outputs the ping data of the labeled end ping to the duration calculator 335.

The example duration calculator 335 of the illustrated example of FIG. 3 accesses the ping data from the start ping identifier 325 and the ping data from the end ping identifier 330. The example duration calculator 330 takes the difference in time between the ping from the start ping identifier 325 and the ping from the end ping identifier 330. This time difference is determined to be the overall duration of the viewing session. The example duration calculator 335 outputs the viewing session duration to the duration adjuster 340.

The example duration adjuster 340 of the illustrated example of FIG. 3 is provided to determine whether additional time is to be added to the viewing session duration calculated by the duration calculator 335. The example duration adjuster 340 generates a probability distribution of end durations from the panel data in the panel database 135. The panel data includes information on the general trends in viewing session durations across panelists from different demographic categories (e.g., age, gender, etc.). The panel data also includes the payload data information on the viewing session durations (e.g., the program name, episode name, genre, etc.). The example duration adjuster 340 generates a probability distribution that reflects the viewing session durations from different panelists. For example, the probability distribution might reflect the viewing session durations for the same episode of a program that different panelists all watched. The example probability distribution may reflect that the viewing session duration that occurred the most for that particular episode of a program across the panelists has the highest probability of occurring. In the illustrated example, the probability distribution from the duration adjuster 240 reflects the end durations for different programs, episodes, genres, etc. that occur the most across the panelists. The example duration adjuster 340 randomly selects an end duration from the range of possible end durations according to the generated probability distribution. The example duration adjuster 340 adds the selected end duration to the time of the end ping in the viewing session. An end duration in examples disclosed herein is the additional duration of time after the last ping of the viewing session, and is included into the viewing session duration. The end duration selected by the duration adjuster 340 is added to the time of the end ping in order to account for the likelihood that the viewing session ended a certain amount of time after the labeled end ping of the viewing session. The example duration adjuster 340 outputs the new viewing session duration to the session partition selector 210 of FIG. 2.

While an example manner of implementing the session builder 105 of FIG. 1 is illustrated in FIGS. 2 and 3, one or more of the elements, processes and/or devices illustrated in FIGS. 2 and 3 may be combined, divided, re-arranged, omitted, eliminated and/or implemented in any other way. Further, the example session partitioner 200, the example threshold calculator 205, the example session partition selector 210, the example ping identifier 300, the example payload change identifier 310, the example ping timer 315, the example threshold detector 320, the example start ping identifier 325, the example end ping identifier 330, the example duration calculator 335, the example duration adjuster 340 and/or, more generally, the example session builder 105 of FIG. 1 may be implemented by hardware, software, firmware and/or any combination of hardware, software and/or firmware. Thus, for example, any of the example session partitioner 200, the example threshold calculator 205, the example session partition selector 210, the example ping identifier 300, the example payload change identifier 310, the example ping timer 315, the example threshold detector 320, the example start ping identifier 325, the example end ping identifier 330, the example duration calculator 335, the example duration adjuster 340 and/or, more generally, the example session builder 105 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example session partitioner 200, the example threshold calculator 205, the example session partition selector 210, the example ping identifier 300, the example payload change identifier 310, the example ping timer 315, the example threshold detector 320, the example start ping identifier 325, the example end ping identifier 330, the example duration calculator 335, and/or the example duration adjuster 340 is/are hereby expressly defined to include a non-transitory computer readable storage device or storage disk such as a memory, a digital versatile disk (DVD), a compact disk (CD), a Blu-ray disk, etc. including the software and/or firmware. Further still, the example session builder 105 of FIG. 1 may include one or more elements, processes and/or devices in addition to, or instead of, those illustrated in FIGS. 2 and 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the session builder 105 of FIG. 1 is shown in FIGS. 4, 5, 6, 7, and 8. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIGS. 4, 5, 6, 7, and 8, many other methods of implementing the example session builder 105 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python. JavaScript, HyperText Markup Language (HTML), Structured Query Language (SQL), Swift, etc.

As mentioned above, the example processes of FIGS. 4, 5, 6, 7, and 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C. (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B. and (3) at least one A and at least one B.

As used herein, singular references (e.g., "a" "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 4:
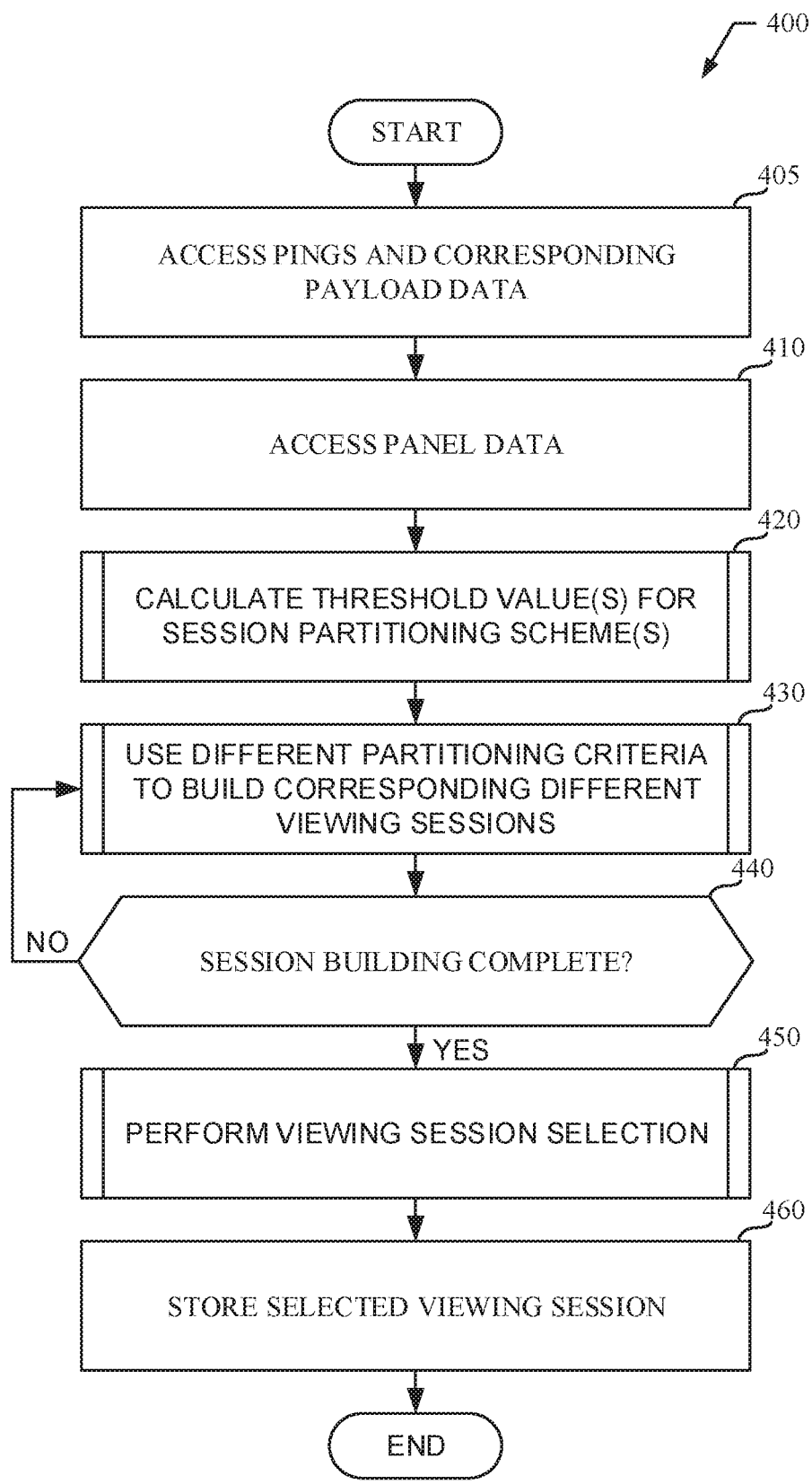
FIG. 4 is a flowchart representative of example machine-readable instructions which may be executed to implement the session builder of FIG. 2.
Figure 5:
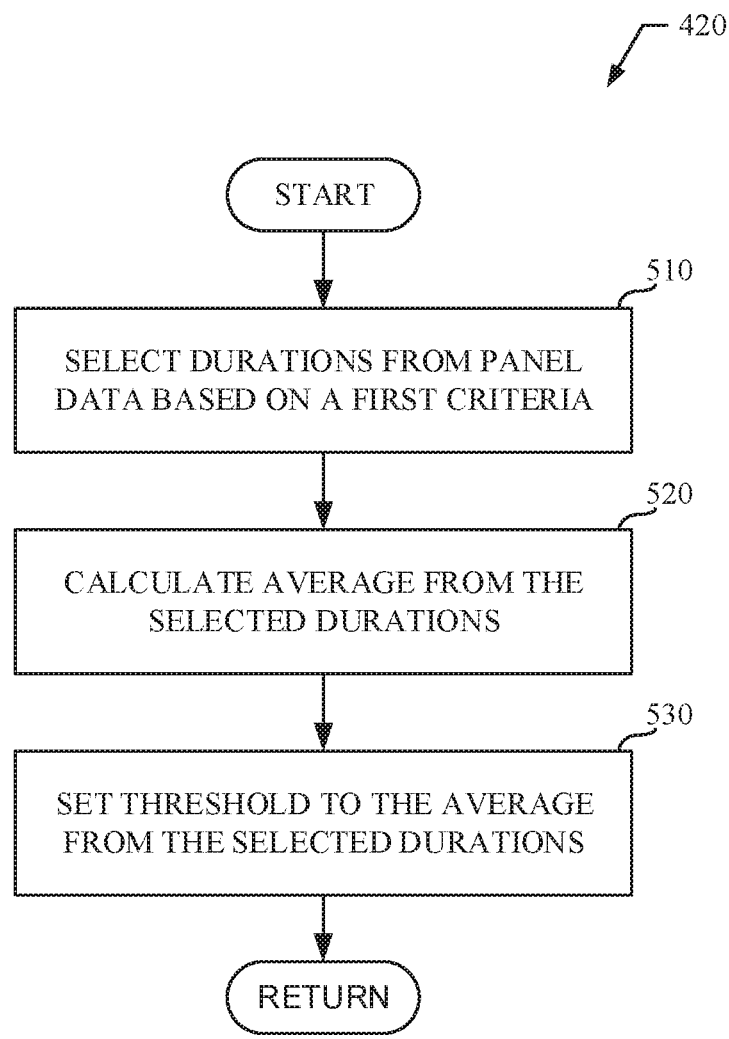
FIG. 5 is a flowchart representative of example machine-readable instructions which may be executed to implement an example threshold detector included in the session partitioner of FIG. 3.

FIG. 4 is a flowchart illustrating an example process 400 that is representative of example machine-readable instructions which may be executed to implement the example session builder 105 of FIG. 2. The program of FIG. 4 begins execution at block 405 at which the session partitioner 200 accesses the pings and corresponding payload data from the network 115. At block 410, the threshold calculator 205 accesses the panel data from the panel database 135. The example threshold calculator 205 accesses reference viewing sessions data from the panel data in the panel database 135. At block 420 the threshold calculator 205 calculates threshold value(s) for the different session partitioning scheme(s). As described in further detail below, the example flowchart 420 of FIG. 5 represents example instructions that may be implemented to calculate the threshold value(s) for the session partitioning scheme(s).

Figure 6:
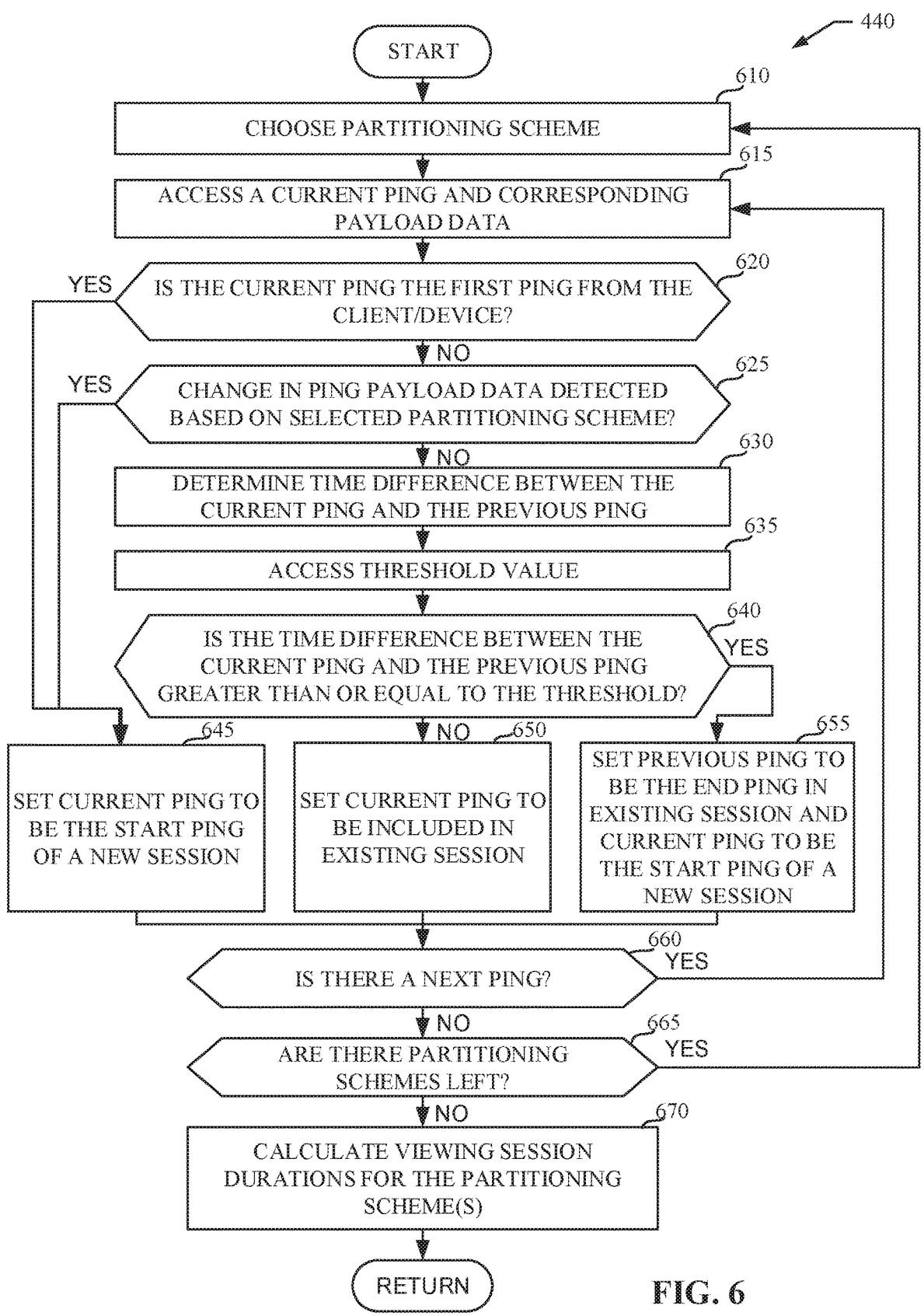
FIG. 6 is a flowchart representative of example machine-readable instructions which may be executed to implement the session partitioner of FIG. 3.

At block 430, the session partitioner 200 uses different partitioning criteria to build corresponding different viewing sessions from the ping data. As described in further detail below, the example flowchart 430 of FIG. 6 represents example instructions that may be implemented to use different partitioning criteria to build corresponding different viewing sessions from the ping data.

Figure 8:
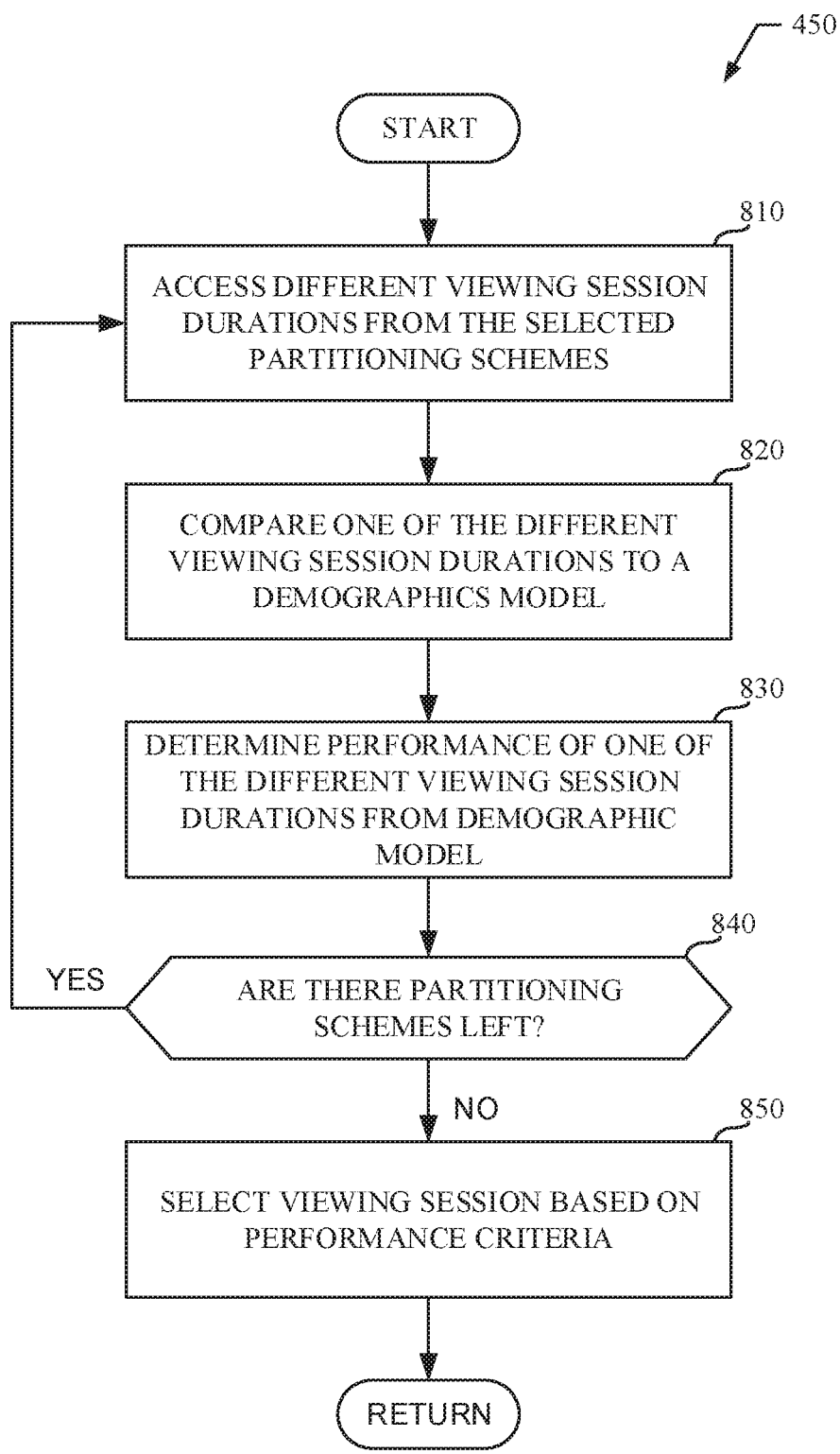
FIG. 8 is a flowchart representative of example machine-readable instructions which may be executed to implement an example session partition selector included in the session builder of FIG. 2.

At block 440, the session builder 125 determines if the session building is complete. If the session builder 125 determines that the session building is completed, then process 400 continues to block 440. If the session builder 125 determines that the session building is not complete yet, then process 400 returns to block 430. At block 450, the session partition selector 210 performs the viewing session selection process. As described in further detail below, the example flowchart 450 of FIG. 8 represents example instructions that may be implemented to perform the viewing session selection.

At block 460, the session partition selector 210 stores the selected viewing sessions in the session database 130. Once the selected viewing sessions are stored, process 400 ends.

FIG. 5 is a flowchart illustrating the process 420 of FIG. 4 and is representative of example machine-readable instructions which may be executed to implement the example threshold calculator 205 of FIG. 2. The program 420 of FIG. 5 begins execution at block 510 at which the threshold calculator 205 selects durations from the panel data based on a first criteria. In the examples disclosed herein, the first criteria may be a certain percentage of the durations in a cutoff ranked from highest to lowest in the panel data. For example, the first criteria may be ten percent of the durations in the cutoff ranked from highest to lowest in the panel data. However, any other criteria may additionally or alternatively be used for the first criteria.

At block 520, the threshold calculator 205 calculates an average value from the selected durations based on the first criteria. After the average is calculated, process 420 continues to block 530 where the threshold calculator 205 sets the threshold value to be the average from the selected durations. Once the threshold value is set, process 420 completes and returns to process 400 of FIG. 4.

FIG. 6 is a flowchart illustrating the example process 440 of FIG. 4 that is representative of machine-readable instructions which may be executed to implement the example session partitioner 200 of FIG. 3. The program of FIG. 6 begins execution at block 610 at which the session partitioner 200 chooses a partitioning scheme to use when building viewing sessions. The partitioning scheme may be chosen to be the genre name, the program name, the episode name, etc., or any combination thereof, included in the ping payload data. At block 615, the ping identifier 300 receives a ping and corresponding payload data from the network 115. At block 620, the example ping identifier 300 determines if the current ping and corresponding payload data indicate that the current ping is the first ping received from the client/device. If the example ping identifier 300 determines that the current ping is the first ping from the client/device, then process 440 continues to block 645 where the current ping is labeled as the start ping of a new viewing session. If the example first ping identifier 300 determines that the current ping is not the first ping from the client/device, then process 440 continues to block 625.

At block 625, the payload change identifier 310 determines if the current ping and corresponding payload data from the first ping identifier 300 indicate that there has been a change in the payload data. The payload change identifier 310 determines if there has been a change in the payload data for the partitioning scheme chosen at block 610. For example, if the genre name partitioning scheme was chosen at block 610, the payload change identifier would determine if there was a change in the genre content of the payload data. If the example payload change identifier 310 determines that the payload data of the current ping has changed, then process 440 continues to block 645 at which the current ping is labeled as the start ping of a new viewing session. If the example payload change identifier 310 determines that the payload data of the current ping has not changed, then process 440 continues to block 630.

At block 630, the ping timer 315 determines the time difference between the current ping and the previous ping received. At block 635, the threshold detector 320 accesses a threshold value for a viewing session from the threshold calculator 205. At block 640, the threshold detector 320 determines if the time difference between the current ping and the previous ping calculated by the ping timer 315 is greater than or equal to the threshold value received from the threshold calculator 205. If the example threshold detector 320 determines that the time difference between the current ping and the previous ping is greater than or equal to the threshold value, then process 440 continues to block 655 where the previous ping is labeled as the end ping of the existing viewing session and the current ping is labeled as the start ping of a new session. If the example threshold detector 320 determines that the time difference between the current ping and the previous ping is less than the threshold value, then process 440 continues to block 650 where the current ping is included in the existing viewing session.

At block 645, the current ping is set to be the start ping of a new viewing session. Block 645 executes when the current ping and corresponding payload data is determined to be a start ping by the example ping identifier 300 or the example payload change identifier 310. At block 650, the current ping is included in the existing session. Block 650 executes when the current ping and corresponding payload data is determined to be included in the existing session by the example threshold detector 320. At block 660, the previous ping is set to be the end ping in the existing session and the current ping is set to be the start ping of a new session. Block 660 executes when the current ping and corresponding payload data is determined to be an end ping by the example threshold detector 320. After execution of any one of blocks 645, 650, and 655, process 440 continues to block 660 where the session partitioner 200 determines if there is a next ping in the ping data set. If the session partitioner 200 determines that there is another ping left in the ping data set, then the process 440 returns to block 615 where the ping identifier 300 accesses a ping and its corresponding payload data from the ping data set. If the session partitioner 200 does not determine that there is a next ping in the ping data set, then process 440 continues to block 665.

At block 665, the session partitioner 200 determines if there are any partitioning schemes left that have not been run. If the session partitioner 200 determines that there are partitioning schemes that still need to be run, then process 440 returns to block 610 where the session partitioner 200 selects another partitioning scheme to run. If the session partitioner 200 determines that there are no partitioning schemes left to run, then process 440 continues to block 670.

At block 670, the duration calculator 335 calculates the viewing session durations for the different partitioning scheme(s) run. After block 670, the process 440 returns to process 400 of FIG. 4.

Figure 7:
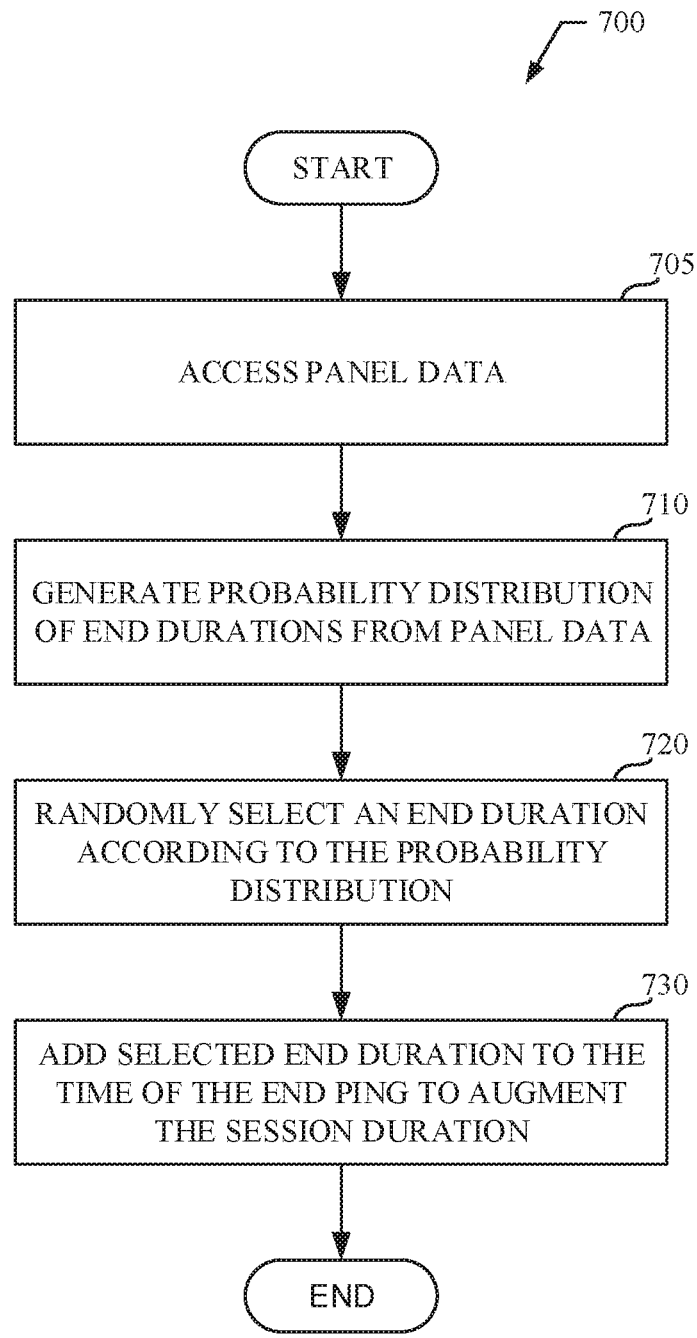
FIG. 7 is a flowchart representative of example machine-readable instructions which may be executed to implement an example duration calculator included in the session partitioner of FIG. 3.

FIG. 7 is a flowchart illustrating a process 700 that is representative of machine-readable instructions which may be executed to implement the duration adjuster 340 of the session partitioner 200 of FIG. 2. The program of FIG. 7 begins at block 705 at which the duration adjuster 340 accesses the panel data from the panel database 135. At block 710, the duration adjuster 340 generates a probability distribution of end durations from the panel data. The panel data includes information on the general trends in viewing session durations across panelists from different demographic categories (e.g., age, gender, etc.). The panel data also includes the payload data information on the viewing session durations (e.g., the program name, episode name, genre, etc.). The duration adjuster 340 generates a probability distribution from the viewing session duration information in the panel data. For example, the probability distribution may reflect the viewing session durations for the same episode of a program that different panelists all watched. The example probability distribution may reflect that the viewing session duration that occurred the most for that particular episode of a program across the panelists has the highest probability of occurring. The probability distribution from the duration adjuster 240 reflects the end durations for different programs, episodes, genres, etc. that occur the most across the panelists. An end duration in example disclosed herein is the duration of time after the last ping of the viewing session that is included into the viewing session duration. The end duration accounts for the time between the end ping of one viewing session and the start ping of a second viewing session.

At block 720, the duration adjuster 340 randomly selects an end duration according to the probability distribution generated at block 710. The example duration adjuster 340 randomly selects an end duration from a range of possible end duration from the probability distribution. At block 730, the duration adjuster 340 adds the selected end duration to the time of the end ping to augment the session duration. As discussed above in connection with block 710, the end duration is used to account for the time between the end ping of one viewing session and the start ping of a second viewing session. The end duration selected by the duration adjuster 340 is added to the time of the end ping in order to account for the likelihood that the viewing session ended a certain amount of time after the labeled end ping of the viewing session. After block 730 is completed, process 700 then ends.

FIG. 8 is a flowchart illustrating a process 450 that is representative of machine-readable instructions which may be executed to implement the session partition selector 210 of FIG. 2. The program of FIG. 8 begins execution at block 810 at which the session partition selector 210 accesses the different viewing session durations from the selected partitioning scheme(s) from the session partitioner 200. At block 820, the session partition selector 210 compares one of the different viewing session durations to a demographics model. In examples disclosed herein, the demographics model represents general trends seen in viewing session durations across different demographics categories accounted for in the panel data from the panel database 135. For example, the panel data may include viewing session duration statistics for the demographic of women ages 12-18. The demographics model would reflect the trends seen in the viewing session duration data for women ages 12-18. The example session partition selector 210 compares one of the possible viewing session durations built in the session partitioner 200 based on the different partitioning schemes to the demographics model that matches the demographics of the household that the ping data is from.

At block 830, the session partition selector 210 determines the performance of one of the different viewing session durations from the demographic model. In example disclosed herein, the performance may be a percentage value for how similar the viewing session duration from the session partitioner 200 is to the viewing session durations found in the demographics model. For example, the viewing session duration from the session partitioner 200 may be 80% (or some other value) similar to the expected viewing session duration based on the demographics model for the household. However, other determinations of the performance may additionally or alternatively be used.

At block 840, the session partition selector 210 determines if there are partitioning schemes left. If the session partition selector 210 determines that there are partitioning schemes left, process 450 returns to block 810 where the session partition selector 210 access different viewing session durations from the selected partitioning schemes. If the session partition selector 210 determines that there are not any partitioning schemes left, process 450 continues to block 850.

At block 850, the session partition selector 210 selects the viewing session duration based on a performance criterion. In examples disclosed herein, the performance criterion may be the highest percentage of similarity across the different viewing session durations. For example, if there was a viewing session duration partitioned on genre, another viewing session duration partitioned on program name, and a third viewing session duration partitioned on episode name, the performance criterion would be which of the three had the highest percentage of similarity found when compared to the demographics model at block 840 above. However, any other performance criterion may additionally or alternatively be used. After the selection of the viewing session durations, process 450 returns to process 400.

Figure 9:
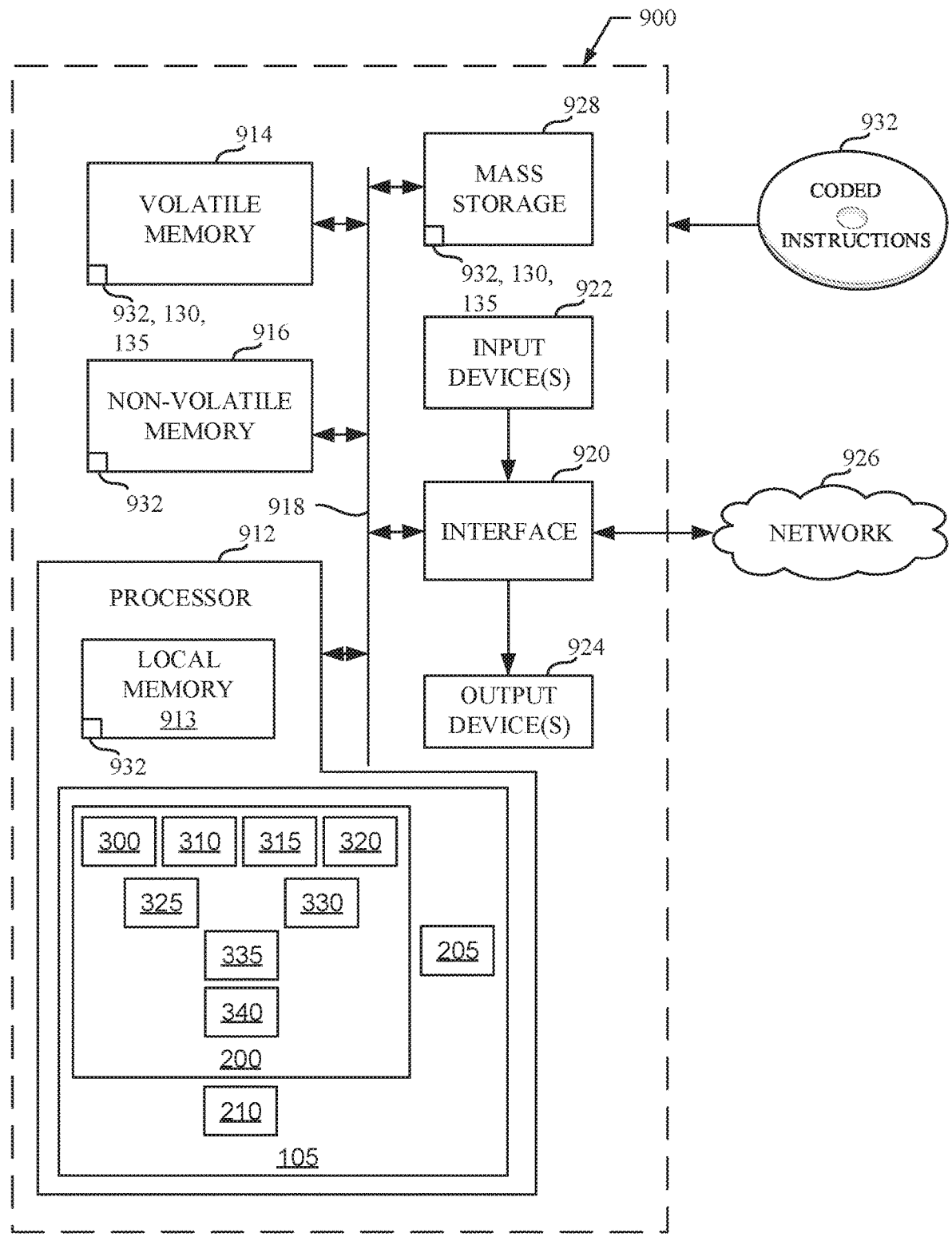
FIG. 9 is a block diagram of an example processing platform structured to execute the instructions of FIGS. 4, 5, 6, 7 and/or 8 to implement the example session builder of FIG. 2.

FIG. 9 is a block diagram of an example processor platform 900 structured to execute the instructions of FIGS. 4, 5, 6, 7, and 8 to implement the session builder 105 of FIG. 1. The processor platform 900 can be, for example, a server, a personal computer, a workstation, a self-learning machine (e.g., a neural network), a mobile device (e.g., a cell phone, a smart phone, a tablet such as an iPad™), or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example session builder 105, the example session partitioner 200, the example threshold calculator 205, the example session partition selector 210, the example ping identifier 300, the example payload change identifier 310, the example ping timer 315, the example threshold detector 320, the example start ping identifier 325, the example end ping identifier 330, the example duration calculator 335, the example duration adjuster 340.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives. In some examples, the mass storage device(s) 928 can implement the session database 130 and/or the panel database 135. In some examples, the volatile memory 914 can additionally or alternatively be used to implement the session database 130 and/or the panel database 135.

The machine executable instructions 932 of FIGS. 4, 5, 6, 7 and/or 8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that build viewing session from ping-level data. The disclosed methods, apparatus and articles of manufacture improve the efficiency of using a computing device by providing the ability to build viewing sessions from ping-level data according to different partitioning schemes. The disclosed methods, apparatus, and articles of manufacture build viewing sessions according to changes in the content being viewed by a media device. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to build a session from ping-level data, the apparatus comprising:
    a threshold calculator to determine a threshold based on reference sessions represented in panel data obtained from panel meters; and
    a session partitioner to:
        determine if a first ping from a device corresponds to a start ping of the session based on (i) the threshold and (ii) first payload data from the first ping;
        determine if a second ping from the device corresponds to an end ping of the session based on (i) the threshold and (ii) second payload data from the second ping; and
        determine a duration of the session based on a difference between a first time associated with the first ping and a second time associated with the second ping.

2. The apparatus of claim 1, wherein the threshold calculator determines the threshold based on an average of durations of reference sessions represented in the panel data.

3. The apparatus of claim 1, wherein the session partitioner is to determine the first ping corresponds to the start ping when at least one of (i) the first ping is an initial ping received from the device, (ii) the first payload data indicates a change in session partitioning, or (iii) a time difference between the first ping and a preceding third ping satisfies the threshold.

4. The apparatus of claim 1, wherein the session partitioner is to:
    determine the second ping is included in the session when a time difference between a third ping and the second ping does not satisfy the threshold, the third ping received between the first ping and the second ping; and
    determine the second ping corresponds to the end ping of the session when a time difference between the second ping and a fourth ping satisfies the threshold, the fourth ping received after the second ping.

5. The apparatus of claim 1, wherein the session partitioner is to:
    generate a probability distribution of end durations from panel data;
    select a first end duration from a range of possible end durations based on the probability distribution; and
    add the first end duration to the second time of the second ping.

6. The apparatus of claim 1, wherein the session is a first session, and the session partitioner is to determine a plurality of possible sessions from the ping-level data based on different partitioning schemes executed in parallel, the plurality of possible sessions including the first session.

7. The apparatus of claim 6, wherein a first one of the partitioning schemes is based on a change in genre content in the first payload data, a second one of the partitioning schemes is based on a change in program name in the first payload data, and a third one of the partitioning schemes is based on a change in episode name in the first payload data.

8. The apparatus of claim 7, further including a session partition selector to select the session from the plurality of possible sessions based on a performance criterion.

9. A method to build a session from ping-level data, the method comprising:
    determining, by executing an instruction with a processor, a threshold based on reference sessions represented in panel data obtained from panel meters;
    determining, by executing an instruction with a processor, that a first ping from a device corresponds to a start ping of the session based on (i) the threshold and (ii) first payload data from the first ping;
    determining, by executing an instruction with a processor, that a second ping from the device corresponds to an end ping of the session based on (i) the threshold and (ii) second payload data from the second ping; and
    determining, by executing an instruction with a processor, a duration of the session based on a difference between a first time associated with the first ping and a second time associated with the second ping.

10. The method of claim 9, wherein the determining of the threshold includes determining the threshold based on an average of durations of reference sessions represented in the panel data.

11. The method of claim 9, wherein the determining of the duration of the session includes:
    generating a probability distribution of end durations from panel data;
    selecting a first end duration from a range of possible end durations based on the probability distribution; and
    adding the first end duration to the second time of the second ping.

12. The method of claim 9, wherein the session is a first session, and further including determining a plurality of possible sessions from the ping-level data based on different partitioning schemes executed in parallel, the plurality of possible sessions including the first session.

13. The method of claim 12, wherein a first one of the partitioning schemes is based on a change in genre content in the first payload data, a second one of the partitioning schemes is based on a change in program name in the first payload data, and a third one of the partitioning schemes is based on a change in episode name in the first payload data.

14. The method of claim 13, further including selecting the session from the plurality of possible sessions based on a performance criterion.

15. At least one non-transitory computer readable medium comprising instructions that, when executed, cause at least one processor to at least:

determine a threshold based on reference sessions represented in panel data obtained from panel meters;

determine that a first ping from a device corresponds to a start ping of a session based on (i) the threshold and (ii) first payload data from the first ping;

determine that a second ping from the device corresponds to an end ping of the session based on (i) the threshold and (ii) second payload data from the second ping; and determine a duration of the session based on a difference between a first time associated with the first ping and a second time associated with the second ping.

16. The at least one non-transitory computer readable medium of claim 15, wherein the instructions, when executed, cause the at least one processor to determine the threshold based on an average of durations of reference sessions represented in the panel data.

17. The at least one non-transitory computer readable medium of claim 15, wherein the instructions, when executed, cause the at least one processor to:

generate a probability distribution of end durations from panel data;

select a first end duration from a range of possible end durations based on the probability distribution; and add the first end duration to the second time of the second ping.

18. The at least one non-transitory computer readable medium of claim 15, wherein the session is a first session, and wherein the instructions, when executed, cause that at least one processor to determine a plurality of possible sessions from ping-level data based on different partitioning schemes executed in parallel, the plurality of possible sessions including the first session.

19. The at least one non-transitory computer readable medium of claim 18, wherein a first one of the partitioning schemes is based on a change in genre content in the first payload data, a second one of the partitioning schemes is based on a change in program name in the first payload data, and a third one of the partitioning schemes is based on a change in episode name in the first payload data.

20. The at least one non-transitory computer readable medium of claim 19, wherein the instructions, when executed cause at least one processor to select the session from the plurality of possible sessions based on a performance criterion.

* * * * *